United States Patent [19]
Moench

[11] Patent Number: 5,600,062
[45] Date of Patent: Feb. 4, 1997

[54] APPARATUS FOR MEASURING UNBALANCE ON A ROTARY MEMBER

[75] Inventor: Uwe Moench, Bensheim, Germany

[73] Assignee: Hofmann Maschinenbau GmbH, Pfungstadt, Germany

[21] Appl. No.: 354,832

[22] Filed: Dec. 8, 1994

[30] Foreign Application Priority Data

Dec. 14, 1993 [DE] Germany .................. 43 42 667.0

[51] Int. Cl.$^6$ ........................................... G01M 1/02
[52] U.S. Cl. .................................... 73/462; 73/471
[58] Field of Search ................... 73/462, 471, 475, 73/476, 477, 478, 862.541

[56] References Cited

U.S. PATENT DOCUMENTS 3,661,016  5/1972  Dopp ........................ 73/462
4,341,119  7/1982  Jackson et al. ............. 73/462
4,905,515  3/1990  Himmler ..................... 73/471

*Primary Examiner*—John E. Chapman
*Attorney, Agent, or Firm*—Cushman Darby & Cushman IP Group of Pillsbury Madison & Sutro, LLP

[57] ABSTRACT

An apparatus for unbalance measurement on a rotary member comprising a rotary mounting device for the rotary member and an oscillatable support for the rotary mounting device for supporting same on the foundation of the apparatus. A force and/or oscillation measuring equipment is operatively disposed between the foundation and the rotary mounting device for measuring centrifugal forces and/or oscillations which result from unbalance of the rotary member. To determine the mass of the rotary member in the rotary mounting device, the apparatus measures the force due to the weight of the rotary member, disposed in the path of transmission of force between the rotary mounting device and the foundation.

4 Claims, 4 Drawing Sheets

APPARATUS FOR MEASURING UNBALANCE ON A ROTARY MEMBER

BACKGROUND OF THE INVENTION

Unbalance on a rotary member such as a wheel can be measured by means of an apparatus having a rotary mounting arrangement for supporting the rotary member whose unbalance is to be measured, the rotary mounting arrangement being supported on a foundation structure of the apparatus by way of an oscillatable support assembly. A device for measuring forces and/or oscillations is disposed between the foundation structure and the rotary mounting arrangement and serves to measure centrifugal forces and/or oscillations which result from unbalance of the rotary member which is rotatably mounted by the rotary mounting arrangement. Such an apparatus which is disclosed in DE 37 16 210 C2, U.S. Pat. No. 4,905,515, can be in the form of a vertical machine which therefore has a vertical mounting for the spindle for carrying the rotary member, or a horizontal machine with a horizontal spindle mounting.

There are however situations in which, besides unbalance on the rotary member, the mass of the rotary member or run-out thereof is also to be measured. For example, when classifying motor vehicle tires, the unbalance is related to the outside radius and the unbalance mass is then related to the tire mass. The unbalance mass occurs as a given fraction of the tire mass, which can also be represented as a percentage value of the tire mass. Tire classification is then effected in accordance with specific limit values in respect of admissible percentage values of that kind.

SUMMARY OF THE INVENTION

An object of the present invention is to provide an apparatus for unbalance measurement on a rotary member, which is also operable to determine the rotary member mass.

Another object of the present invention is to provide an apparatus for measuring unbalance on a rotary member such as a vehicle wheel, which is also adapted to determine the mass of the rotary member by means of a simple structure without involving major modification in the apparatus configuration.

In accordance with the present invention the foregoing and other objects are achieved by an apparatus for measuring unbalance on a rotary member, comprising a rotary mounting means for rotatably supporting the rotary member and an oscillatable support means for supporting the rotary mounting means on the foundation structure of the apparatus. A force and/or oscillation measuring means is operatively disposed between the foundation structure and the rotary mounting means for measurement of centrifugal forces and/or oscillations resulting from unbalance of the rotary member supported by the rotary mounting means. For determining the mass of the rotary member carried by the rotary mounting means a means for measuring the force due to the weight of the rotary member is provided in the transmission of force between the rotary mounting means and the foundation structure.

In accordance with a preferred feature of the invention the means for measuring the force due to the weight of the rotary member comprises electrical force pick-ups or sensors, which can also be referred to as force gauges.

In another preferred feature of the invention, the apparatus may have at least one deformation body which is deformable by the force due to the weight of the rotary member arranged in the rotary mounting means, with the electrical force sensor being associated with the deformation body. The deformation body or bodies can comprise at least one component provided in the oscillatable support means, for example in the form of a leaf or bar spring. Deformation of the deformation body, caused by the force produced by the weight of the rotary member, is sensed by for example strain gauge strips carried on the deformation body. That arrangement produces an electrical signal which is proportional to the force due to the weight of the rotary member and which is then subjected to suitable further processing for determining the mass of the rotary member.

It will be appreciated that it is also possible to use other electrical force sensors, for example piezoelectric members.

Further objects, features and advantages of the present invention will be apparent from the following description of preferred embodiments thereof.

DESCRIPTION OF PREFERRED EMBODIMENTS

Figure 1:
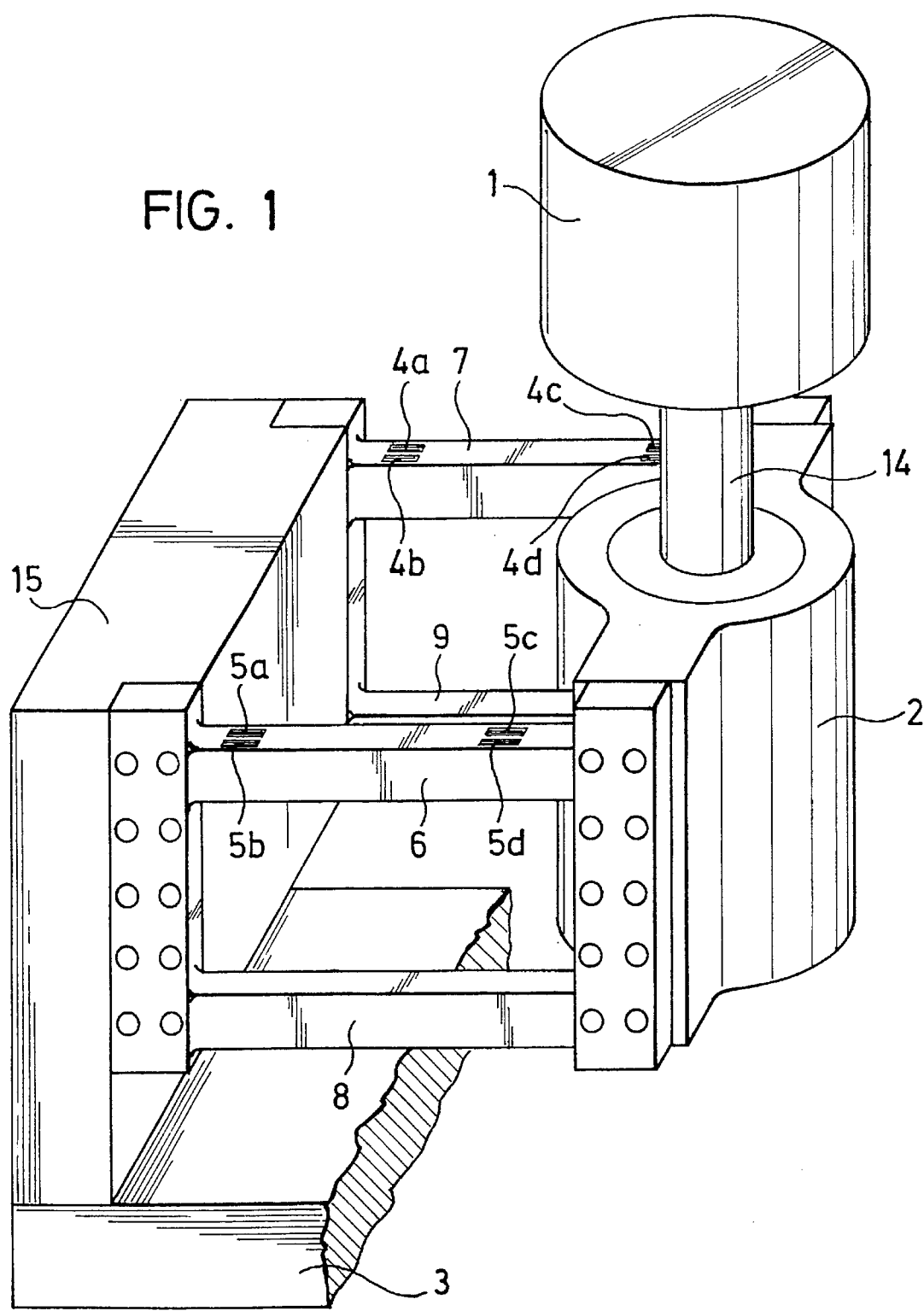
FIG. 1 shows a first embodiment of an apparatus in accordance with the invention.

Referring firstly to FIG. 1, shown therein is a perspective view of an apparatus for measurement of unbalance on a rotary member diagrammatically indicated at reference numeral 1. The apparatus comprises a rotary mounting means 2 in which the rotary member 1 to be measured is mounted rotatably in known manner by means of a measuring spindle 14. The rotary mounting means 2 is oscillatably supported on a foundation structure 3 of the apparatus by means of a machine frame arrangement 15, by way of an oscillatable system comprising an upper pair of bar springs 6, 7 and a lower pair of bar springs 8, 9 which are mounted on the rotary mounting means 2 at respective sides thereof. The bar springs constitute deformation bodies which are deformable by the force due to the weight of the rotary member 1 which is rotatably carried by the rotary mounting means 2. Measuring devices such as measuring transducers are operatively disposed between the rotary mounting means 2 and the foundation structure 3 and serve to detect centrifugal forces and/or oscillations which result from unbalance of the rotary member 2. A suitable measuring arrangement for that purpose is disclosed in U.S. Pat. No. 4,905,515 to which reference is accordingly directed for incorporation of the content thereof in this specification. The electrical signals produced by the measuring transducers are subjected to suitable processing in the usual manner in an electronic measuring system (reference may be directed in this respect to Hofmann-News 5, Imprint 09.85 D or Hofmann-News 19, Imprint 09.85 D).

For determining the mass of the rotary member 1 supported by the rotary mounting means 2, the apparatus further has a means for measuring the force due to the weight of the rotary member 1, which can be referred to for the sake of brevity as the weight force measuring means. The weight force measuring means is provided in the flow of force, that is to say within the path of transmission of force, between the rotary mounting means 2 and the foundation structure 3. To form the weight force measuring means, at least one of the two upper bar springs 6 and 7 is used as an electrical force pick-up or sensor, being provided with strain gauge strips as indicated at 4a–d and 5a–d. The strain gauge strips are arranged on the pair of upper spring bars 6, 7 at locations at which deformation thereof is produced by the force due to the weight of the rotary member 1 rotatably carried in the rotary mounting means 2. It will be appreciated however that it is also possible for the strain gauge strips or other electrical sensors to be arranged on the lower pair of spring bars 8, 9. It will be seen that this measuring assembly utilizes the components which are provided in any case in the oscillatable support means of the rotary mounting means 2, to provide the weight force measuring means for determining the mass of the rotary member 1.

It will be noted at this point that in this embodiment the operation of measuring centrifugal force, which is effected for determining unbalance of the rotary member 1, is performed for example in the manner disclosed in above-mentioned U.S. Pat. No. 4,905,515.

Figure 2:
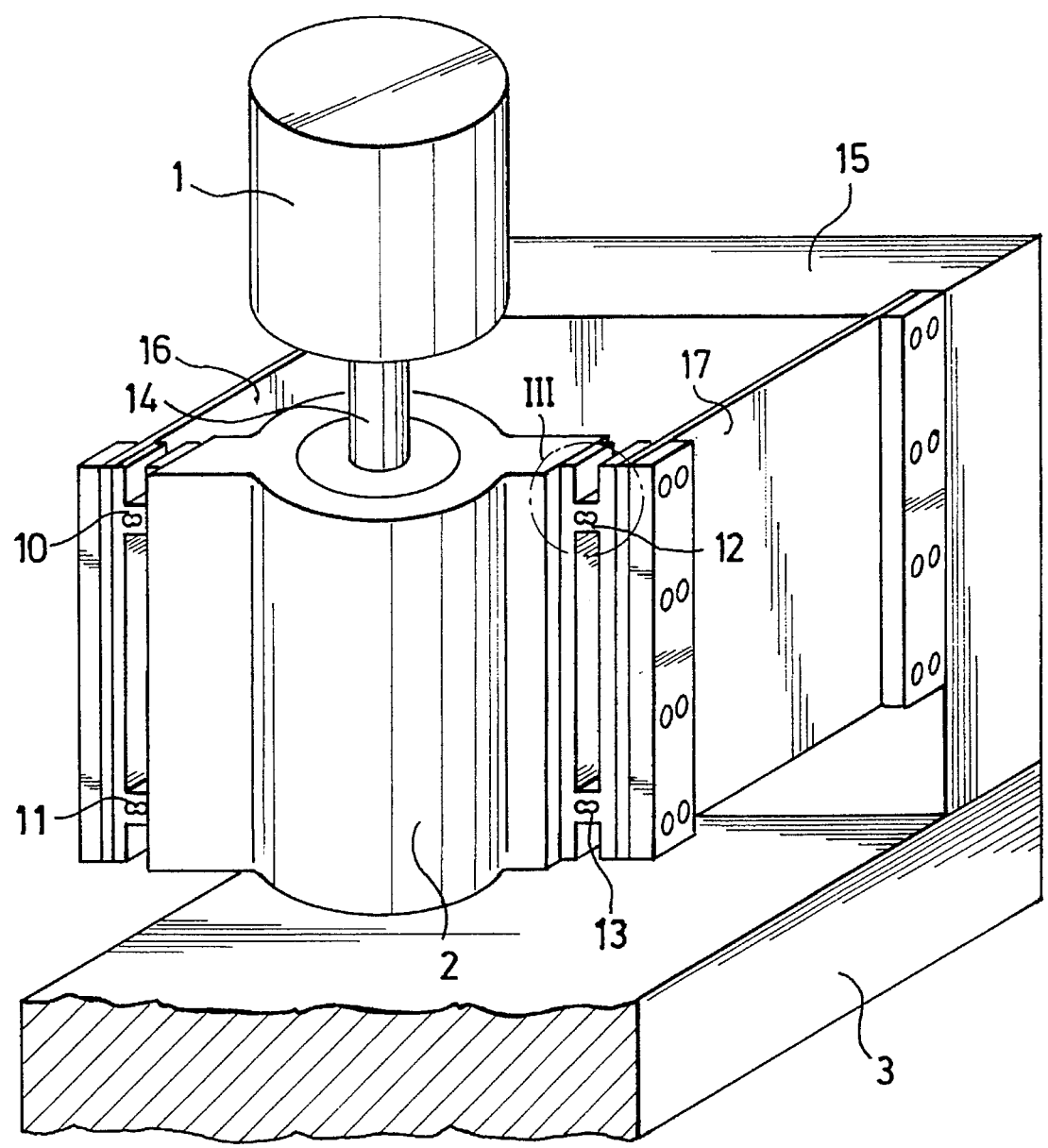
FIG. 2 shows a further structure as a second embodiment of the apparatus according to the invention.

Looking now at FIG. 2, reference numeral 1 again identifies the rotary member of which the unbalance and the mass are to be ascertained while reference numeral 2 again denotes the rotary mounting means for rotatably supporting the rotary member. The rotary mounting means 2 is oscillatably supported on the foundation structure 3 of the apparatus by way of the oscillatable support means provided by the leaf springs 16 and 17 which are connected at their one ends to the rotary mounting means 2 at respective sides thereof, with the other ends of the leaf springs 16 and 17 connected to the machine frame 15 disposed on the frame structure 3. Between the rotary mounting means 2 and the oscillatable support means are deformation bodies indicated at 10, 11, 12 and 13 in FIG. 2, which are provided with electrical force pick-ups or sensors, more especially for example strain gauge strips as indicated at 18a–d in FIG. 3. It will be seen therefore that the deformation bodies 10–13 are disposed between the front or cantilevered ends of the leaf springs 16, 17 of the oscillatable support means, and the rotary mounting means 2 for the rotary member 1.

Figure 3:
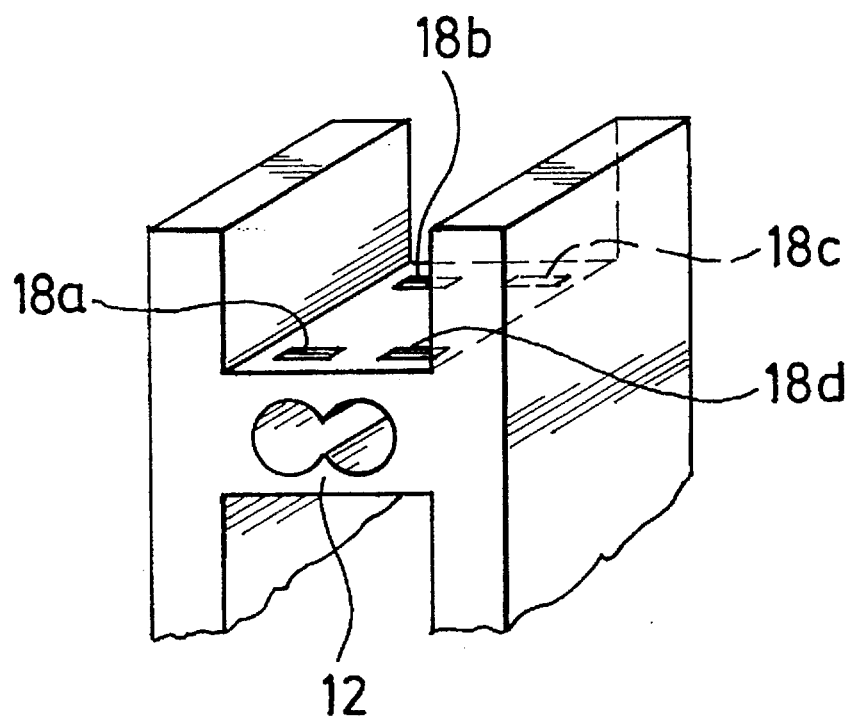
FIG. 3 shows a detail from FIG. 2 of a deformation body of a force measuring member.

In operation of the apparatus the deformation bodies 10–13 are deformed by the force due to the weight of the rotary member 1 rotatably carried in the rotary mounting means 2 and the strain gauge strips indicated at 18a–d in FIG. 3, which are carried on the deformation bodies 10–13, supply corresponding electrical signals to an evaluation assembly for determining the mass of the rotary member.

In this embodiment also measurement of the centrifugal force generated by unbalance of the rotary member 1 when it rotates, such measurement being effected for determining the unbalance of the rotary member 1, is carried out for example in the manner disclosed in above-mentioned U.S. Pat. No. 4,905,515.

FIG. 3 more specifically shows a deformation body 12 of an electrical force-measuring element, on which the strain gauge strips 18a–d are disposed. As indicated above, they serve to measure the deformation which occurs due to forces acting thereon, resulting from the weight of the rotary member 1 carried by the rotary mounting means 2. The other deformation bodies 10, 11 and 13 shown in FIG. 2 are also provided with suitable measuring devices such as the strain gauge strips 18a–d.

Figure 4:
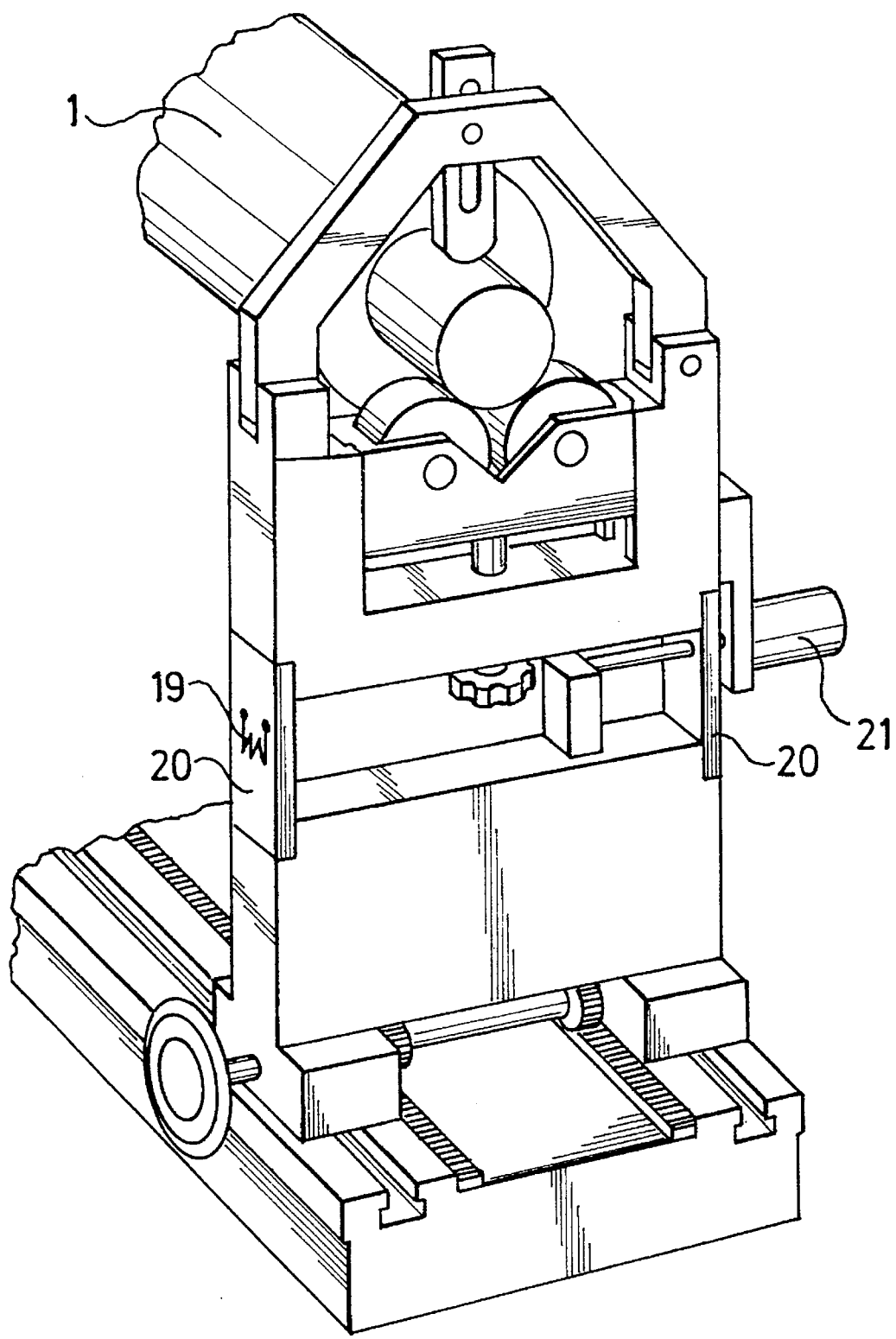
FIG. 4 shows a third embodiment of an apparatus in accordance with the invention.

Reference will now be made to FIG. 4 showing a third embodiment of an apparatus according to the invention, on a mounting stand of a horizontal balancing machine. In this embodiment the rotary member 1 to be measured is rotatable about a horizontal axis in an oscillatable rotary mounting means in the upper part of the mounting stand, with support springs 20 providing an oscillatable support action for the rotary mounting means on the foundation base of the apparatus. Strain gauge strips 19 are disposed on the support springs 20 and are thus provided for determining the mass of the rotary member 1 mounted in the apparatus. Centrifugal forces which are detected in the procedure for measuring unbalance of the rotary member 1 are sensed by a measuring transducer as indicated at 21.

It will be apparent from the foregoing description of preferred embodiments of the apparatus according to the invention that there is now no need for an additional weighing machine for determining the mass of the rotary member to be measured. It is possible in a single apparatus to obtain information both about any unbalance of the rotary member and also about the mass of the rotary member. In that respect, use is made of the fact that a weight force measuring means for determining the mass of the rotary member is integrated into the unbalance measuring apparatus in the force flux, or the path of transmission of force, between the foundation structure of the apparatus and the part of the apparatus which is subjected to the force due to the weight of the rotary member. In this way it is possible to use a single machine or measuring assembly for carrying out for example the above-discussed operation of classifying rotary members, such as vehicle wheels or tires, in particular in accordance with unbalances which correspond to given percentage values in respect of the mass of the rotary member. A further situation of use is where the admissible speed of rotation of a rotary member can be ascertained from the measured mass thereof and the admissible approximation to the resonance speed of rotation of the oscillation system.

It will be appreciated that the above-described embodiments of the apparatus according to the invention have been set forth solely by way of example and illustration of the principles of the invention and that various modifications and alterations may be made therein without thereby departing from the spirit and scope of the invention.

What is claimed is:

1. Apparatus for unbalance measurement on a rotary member, comprising a foundation, a rotary mounting means for the rotary member, an oscillatable support means for supporting the rotary mounting means on said foundation, a measuring means operatively disposed between said foundation and the rotary mounting means for measurement of a phenomenon which results from unbalance of the rotary member, and a means for measuring the force due to the weight of the rotary member carried by the rotary mounting means, disposed in the path of transmission of force between the rotary mounting means and said foundation, for determining the mass of the rotary member arranged in the rotary mounting means, said rotary member weight force measuring means including an electrical force sensor that comprises at least one deformation body, arranged between said rotary mounting means and said oscillatable support means, which is deformable by the force due to the weight of the rotary member arranged in said rotary mounting means.

2. Apparatus as set forth in claim 1 wherein said means for measurement of a phenomenon which results from unbalance of the rotary member comprises a force measuring means.

3. Apparatus as set forth in claim 1 wherein said means for measurement of a phenomenon which results from unbalance of the rotary member comprises an oscillation measuring means.

4. Apparatus as set forth in claim 1 wherein said means for measurement of a phenomenon which results from unbalance of the rotary member comprises a force and oscillation measuring means.

* * * * *